No. 715,613. Patented Dec. 9, 1902.
C. C. SCHWANER.
TRACE BUCKLE.
(Application filed Mar. 8, 1902.)
(No Model.)
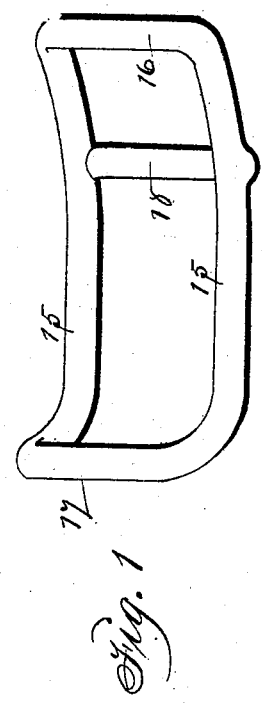
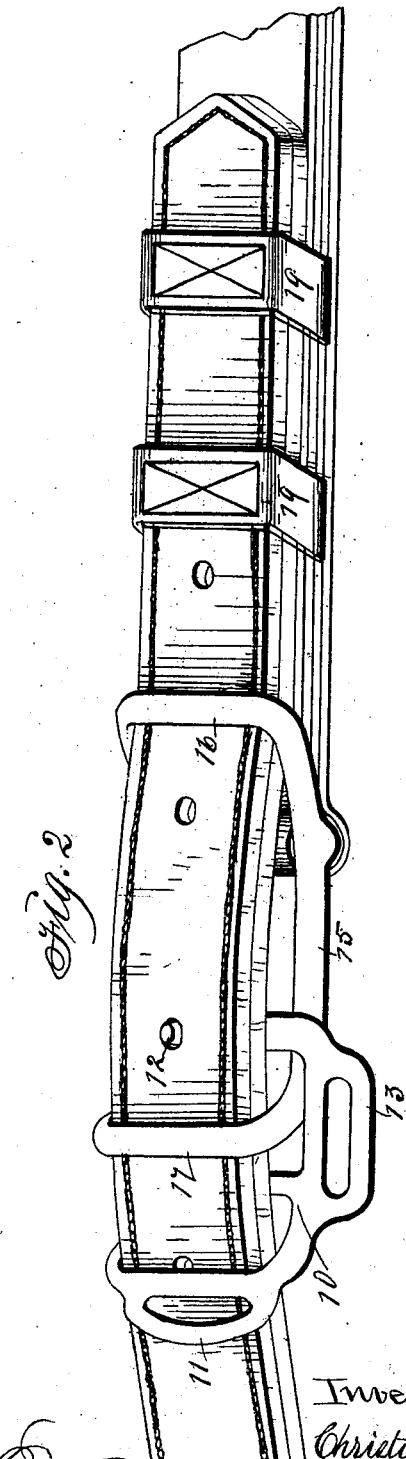
Witnesses:
S. F. Christy
L. H. Orwig
Inventor:
Christian C. Schwaner
By Thomas F. Orwig, Attorney.
THE NORRIS PETERS CO., PHOTO-LITHO., WASHINGTON, D. C.

UNITED STATES PATENT OFFICE.

CHRISTIAN C. SCHWANER, OF WINTERSET, IOWA.

TRACE-BUCKLE.

SPECIFICATION forming part of Letters Patent No. 715,613, dated December 9, 1902.

Application filed March 8, 1902. Serial No. 97,324. (No model.)

*To all whom it may concern:*

Be it known that I, CHRISTIAN C. SCHWANER, a citizen of the United States, residing at Winterset, in the county of Madison and State of Iowa, have invented a new and useful Trace-Buckle, of which the following is a specification.

My object is to facilitate connecting, adjusting, and disconnecting a harness-trace from a hame-tug.

My invention consists in the construction and combination of parts as hereinafter set forth, pointed out in my claims, and illustrated in the accompanying drawings, in which—

Figure 1 is a perspective view of that part or member of the buckle that is adapted to be fixed to a hame-tug and to serve as a loop for the front end of a trace when said end is connected with the buckle-frame and extended forward to overlie the front portion of the hame-tug. Fig. 2 is a perspective view showing the hame-tug and trace detachably connected by means of the two parts of the buckle. Fig. 3 is a longitudinal sectional view that shows where the leather trace is clamped and slightly bent or deflected from a straight line.

The numeral 10 designates a buckle-frame and member of common form that may be made with or without loops 11 at its front end and has a tongue 12 projecting outward at the other end and loops 13 and 14 at its sides in a common way.

The improved bail or member, that is adapted to be adjustably and detachably connected with the frame 10, consists of mating parallel sides 15, that are curved upward and rigidly connected at one end portion by a cross-bar 16, and the curved ends and cross-bar specially adapted to serve as a loop to clasp the overlying end portion of a trace to a hame-tug, as required in practical use. Their other ends are rigidly connected by a cross-bar 17, and at some distance from the cross-bar 17 a cross-bar or screw 18 is fixed to the parallel sides 15, preferably in the plane of their lower edges, as clearly shown in Fig. 1, and thereby specially adapted for fixing the end of a hame-tug thereto, as shown in Figs. 2 and 3.

When the rear end of my improved bail is extended through the frame 10, the cross-bar at the front end of the frame, that has the tongue 12, will slide back and forth on the parallel sides 15, as required, to facilitate connecting, adjusting, fastening, unfastening, and disconnecting the trace from the hame-tug. When the front end of a trace is fastened to a hame-tug by means of my buckle, the end portions of the parallel sides 15 and the cross-bar 17 will serve as a loop for clasping, binding, and fastening the end of the trace to the frame 10, and the bar 16 will inclose the end of the free end portion of the trace, as required, to press it upon the rear end portion of the hame-tug, that is fixed to the cross-bar 18, and, in combination with fixed loops 19, aid in retaining the front end of the trace in position.

It is obvious the bail or member to which the hame-tug is fixed may vary in size and weight, as desired, and that the cross-piece 18 may be cast integral with the side bars 15 or connected therewith in any suitable way in such a manner that the rear end of a hame-tug can be fixed thereto.

Having thus described the construction and application of my invention, its practical operation and utility will be readily understood by persons familiar with the art to which it pertains.

What I claim as new, and desire to secure by Letters Patent, is—

1. A member of a two-part buckle composed of two mating parallel sides curved upward at one end and rigidly connected at each end by a cross-bar and a cross-bar fixed to the lower edge portions of the parallel sides and a hame-tug fixed to the cross-bar at the lower edges of the parallel sides at some distance from the end cross-bar, as shown and described for the purposes stated.

2. A two-part trace-buckle, consisting of a frame or member having a tongue at the center of one of its ends and a central cross-bar, a frame composed of two parallel curved sides united at their ends by a cross-bar and a cross-bar at some distance from the ends of the parallel sides and a hame-tug fixed to the said cross-bar near one end of the frame, to connect, adjust and disconnect the end of a trace in the manner set forth.

CHRISTIAN C. SCHWANER.

Witnesses:
R. H. COOPER,
A. L. STOUT.